April 6, 1971 J. B. RUST 3,573,922

PHOTOPOLYMERIZABLE COMPOSITION AND PROCESS

Filed May 15, 1969

John B. Rust,
INVENTOR.

BY.

ATTORNEY.

United States Patent Office 3,573,922
Patented Apr. 6, 1971

3,573,922
PHOTOPOLYMERIZABLE COMPOSITION
AND PROCESS
John B. Rust, Los Angeles, Calif., assignor to Hughes
Aircraft Company, Culver City, Calif.
Continuation-in-part of application Ser. No. 450,397,
Apr. 23, 1965. This application May 15, 1969,
Ser. No. 824,902
Int. Cl. G03c 1/68
U.S. Cl. 96—115
17 Claims

ABSTRACT OF THE DISCLOSURE

A method of photopolymerization of a photopolymerizable vinyl monomer system with a photooxidant and catalyst combination capable of coreactivity to effect visible photopolymerization in visible light and more particularly light-activatable dye and sulfinic acid catalyst combination reacting with each other to initiate photopolymerization in and over the light range of about 3800 A. to 7200 A.

This is a continuation-in-part of applicant's application Ser. No. 450,397 filed Apr. 23, 1965, now abandoned.

The present invention relates to solid polymers and to the formation thereof by a process of photo-induced polymerization of unsaturated polymerizable monomers in the presence of a novel catalyst system. More particularly, the present invention relates to a unique photo-redox catalyst system which through the action of visible light becomes a highly efficient initiator of addition polymerization.

The polymerization of monomers such as vinyl compounds by subjecting them to elevated temperatures is well known. The polymerization of certain monomeric compounds by subjecting them to the action of optical energy of ultraviolet wavelengths, for example, is also known. In the polymerization of vinyl monomers by ultraviolet radiation, for example, a photon is absorbed by the vinyl monomer which, thereupon, itself becomes a free-radical for the initiation of chain growth. Dyestuffs also have been reported to be useful as photosensitizers for the actinic light polymerization of certain vinyl monomers. Usually, however, such photopolymerization, if practiced without the use of a catalyst, proceeds at an extermely slow rate often requiring exposure of an hour or more. Hence, the art of photopolymerization has turned to the use of catalysts and promoters of the desired reactions in order to obtain faster reaction times and complete polymerization. Typical of this prior art effort is the catalytic photopolymerization process described in U.S. Patent 3,075,907 to S. Levinos who teaches the use of a nonoxidizing silver compound catalyst which is effective to achieve such polymerization under the influence of visible radiation. While the process of Levinos constitutes a valuable contribution to the art of photopolymerization, the polymerization times reported in his patent still leave much to be desired. It will be understood that the "polymerization time" as used herein includes the time required for polymerization after the initiation thereof as well as what is called the "induction period," which is the interval of time between the first exposure of the photosensitive system to radiation and the initiation of polymerization.

Although many interesting and valuable processes for polymerizing vinyl monomers have been described for bringing about photo-induced polymerization, all of the processes of which I am aware require an inordinately large photon flux; that is, substantially high light intensities are required. The reason for this, possibly, lies in the poor over-all quantum efficiency resulting from low reactivity of the free-radicals that are produced, or side reactions which lead to rapid destruction of free-radicals. For these reasons, prior art processes have not been useful in the production of solid addition polymers at low light levels such as are found in a normally lighted room or in shady areas out-of-dors, unless impractically long exposure periods are employed.

Among free-radical catalysts for the polymerization of vinyl monomers is a group called redox catalysts whose mode of action is the production of free-radicals by the oxidation of a suitable reducing agent, or the reduction of a suitable oxidizing agent or both. These redox catalytic systems are practiced without the use of light and have been especially useful in the production of synthetic rubbers and the like. However, with these systems it has been necessary to batch-mix the raw materials since there is no way to inhibit polymerization once such mixing has occurred. The availability of a photosensitive redox catalyst system would make it possible to mix materials continuously and to control the polymerization as desired simply by the application or nonapplication of radiation or light to the mixture.

I have now discovered a new catalyst system which includes: (1) an organic compound, called a photo-oxidant, which is capable of efficiently absorbing a photon having an energy in the visible portion of the spectrum and which, after absorption of the photon, attains an activated state corresponding to an oxidant or electron acceptor; and (2) an organic sulfinic compound capable of reacting with the photo-oxidant to form a free radical by electron transfer to the photooxidant. As used herein and in the appended claims, the terms "photo-oxidant" or "photo-active dye" means any organic compound which in its ground or unilluminated state is inactive and incapable of functioning effectively as an oxidant but which can acquire an oxidation potential or the ability to function to impart color or as an oxidant when subjected to visible light of a wavelength in and over the range of from about 3800 A. to about 7200 A., effecting visible photopolymerization. The phrases "photo-oxidant" or "photo-active dye" thus are employed as more convenient expressions in preference to "photo-oxidizable" or "photo-activatable" and are intended to refer to the appropriate organic materials whether they are in the ground or activated state unless the context indicates otherwise. Also as used herein, the phrase "organic sulfinic compound" includes any sulfinic acid and the salts and esters thereof as well as adducts of sulfinic acids with carbonyl compounds and especially aldehydes. This newly discovered catalyst system possesses the essential features of a redox catalyst system, except that the oxidant component is created by photo-activation of a normally inactive organic compound. I have therefore called this unique catalyst system a photo-redox catalyst system.

I have discovered that polymerizable monomeric vinyl compounds may be directly photopolymerized in extremely short periods of time, say of less than 30 seconds, by exposing a solution or dispersion of the monomer to the action of radiation within a wavelength range of from 3800 A. to 7200 A. while using the novel photo-redox catalyst system of the invention. I have found that the free-radicals generated by withdrawal of an electron from an organic sulfinic compound are characterized by a very high degree of reactivity and are extremely active initiators of polymerization. In the dark, however, the photo-redox catalyst system of the present invention is completely passive. No polymerization whatsoever can be detected on storage for long periods in the dark. However, upon exposure to visible light of even relatively low levels of intensity, rapid polymerization of appropriate monomers takes place. With properly prepared mixtures of appropriate ingredients, substantial polymerization can be demonstrated with less than one second exposure to diffuse room illumination.

Hence, it is an object of my invention to form solid polymers directly by the irradiation of monomers containing vinyl groups in the presence of a photo-redox catalyst system comprising a photo-oxidant or photo-active dye and an organic sulfinic compound.

In general, the process of the present invention is carried out by mixing appropriate quantities of the monomer and the photo-active dye in one solution, with or without a cross-linking agent, and then providing a reaction mixture by mixing appropriate quantities of this solution with a solution of the organic sulfinic compound. The reaction mixture is then ready for photopolymerization by exposing the same to appropriate radiation in the visible portion of the spectrum. In an alternate procedure, the process of the present invention is carried out by mixing appropriate quantities of monomer in one solution and appropriate quantities of the photo-active dye and organic sulfinic compound or suitable mixtures thereof, in a second solution, and then mixing the two solutions in the desired ratio to produce a reaction mixture which is ready for photo-redox polymerization. The mechanism of the photopolymerization process of the present invention appears to function as follows. Upon irradiation with optical energy the dye becomes activated and capable of functioning as an oxidant of materials, particularly the organic sulfinic compound, which the dye in its inactivated state is incapable of oxidizing. Such dyes are identified herein as photo-active dyes or simply as a photo-oxidant. The photo-active dye reacts with the organic sulfinic compound to produce a catalytic free-radical which functions as an extremely active and efficient initiator for polymerization of the vinyl monomer. One outstanding feature of the photo-redox catalyst system of the present invention is the extreme rapidity of the photochemical polymerization reactions. In many instances there has been no measurable induction period involved at all. Another outstanding feature is the low level of light intensity to which the catalyst system of the invention responds.

The process of the invention will be described in greater detail by reference to the drawings in which.

An organic compound which absorbs radiation in the visible portion of the spectrum must be colored, and therefore, by definition, it is classed as a dye. I have found that the class of organic compounds that absorb radiation in the visible portion of the spectrum and which attain a photo-oxidant or photo-activated state, capable of reacting with an organic sulfinic compound to produce a free-radical by withdrawing and transferring an electron, is typified by the quinoidal dyes such as phenothiazine dyes, phenazine dyes, acridine dyes, xanthene dyes, and the like. A more general characteristic of the photo-active organic compounds suitable for use in the process of the present invention is an oxidation potential in the visible light-activated state, but not in the ground state of the dye, which permits the spontaneous removal of an electron from the organic sulfinic compound, thus resulting in the formation of a highly reactive, polymerization-initiating free-radical. Dyes suitable for use in the process of this invention preferably have the structural formula:

where R carries a positive charge and is an imonium, alkylimonium, dialkylimonium, or oxonium group; R' is hydrogen or an amino, alkylamino, dialkylamino, or hydroxyl group; X is nitrogen or substituted carbon; Y is sulfur, oxygen or substituted nitrogen; and $A^{\ominus}$ is any suitable anion. It is to be understood that the double bonds, and positive charge on R, may rearrange to a more stable configuration without in any way affecting the validity or representation of the above structural formula. Although a very large number of dyes, all possessing the above structural formula, are useful in this invention, some show greater activity than others. I have found that the following dyes possessing this structure are typical in their activity and representative of the photo-oxidants of this invention: methylene blue, thionine, azure B, rose bengal, phenosafranine, acridine orange, riboflavin, fluorescein, erythrosin B, safranin O, pyronine B, capri blue, azure A, resorufin and the like. However, it has been found that the dye, thioflavin T, which does not have this general structural formula, also is suitable for use in the practice of this invention. Hence, the practice of the invention is not necessarily limited to dyes having the structural formula given.

In the process of the invention, when a phenothiazine dye is employed, the formation of a dye semiquinone is a by-product of the reaction between the photo-active phenothiazine dye and the organic sulfinic compound. However, the activity of the free-radical formed in this reaction is so great as to dwarf any polymerization-initiating properties of the semiquinone although such action is not detrimental to the polymerization process.

The process of the present invention has also been found to be more tolerant of excess oxygen than the photo-polymerization processes of the prior art. It is known that certain impurities such as oxygen in these processes act as polymerization inhibitors necessitating an "induction period" during which the polymerization-initiator must react with these impurities until they are consumed and polymerization can proceed. In the process of the present invention, however, greater amounts of oxygen, which is usually the principal impurity present, can be tolerated because the initiator which is formed by the photochemical reaction is so active that only a fraction of the initiator is required to initiate polymerization even in the presence of excess oxygen.

The process of the present invention may be made specifically sensitive to a predetermined optical frequency or band of frequencies because the catalyst system of the process of the invention includes a photo-sensitive dye. Thus, while one of the purposes of the dye is to react under the influence of and in response to radiation with the organic sulfinic compound to produce the polymerization-initiating free-radical, advantage may also be taken of the fact that such photo-sensitive dyes are characterized by having a frequency-dependent maximum photon absorption efficiency. Hence, by selecting the proper dye, the photopolymerization process of the invention can be tailored to respond to a desired optical frequency or frequencies.

As the organic sulfinic compound of this invention, I may employ any of the organic sulfinic acids, in their free forms, or their salts or as organic esters as well as adducts of sulfinic acids with carbonyl compounds and especially aldehydes. Examples of appropriate sulfinic acids are: p-toluenesulfinic acid, benzenesulfinic acid, p-bromobenzenesulfinic acid, naphthalenesulfinic acid, 4-acetamidobenzenesulfinic acid, 5-salicylsulfinic acid, and other aromatic or aliphatic sulfinic acids such as ethane- sulfinic acid, 1,4-butanedisulfinic acid, α-toluenesulfinic acid and the like.

The salts of these acids may be any of the soluble salts which are compatible with the other components employed in the photo-sensitive solution and typically include the sodium salts, the potassium salts, the lithium salts, the magnesium salts, the calcium salts, the barium salts, the silver salts, the zinc salts, the aluminum salts, and the like. Appropriate esters of these acids typically include the methyl esters, the ethyl esters, the propyl esters, the butyl esters, and the like. Aldehyde adducts of these sulfinic acids are, for example, the adducts formed with formaldehyde, acetaldehyde, iso-butyraldehyde, heptaldehyde, and the like. Other appropriate organic sulfinic compounds include the sulfinamides, the N-alkylsulfinamides, and the N-arylsulfinamides. It is to be understood that this listing is by no means intended to be exhaustive of the compounds and materials that may be employed in the practice of the invention.

Among the polymerizable unsaturated organic monomers, certain classes of monomers appear to be more satisfactory than others for adapting the photo-redox catalyst system to a photographic technique. In general, polymerizable monomers useful in the present invention are termed herein as vinyl monomers and are typified by: acrylamide, acrylonitrile, N-(hydroxyethyl) acrylamide, methacrylic acid, acrylic acid, calcium acrylate, barium acrylate, methacrylamide, vinyl acetate, methyl methacrylate, methyl acrylate, ethyl acrylate, vinyl benzoate, vinylpyrrolidone, vinyl methyl ether, vinyl butyl ether, vinyl butyrate, styrene, butadiene, vinyl chloride, vinylidene chloride and the like.

To obtain a useful photographic effect, it is highly desirable to utilize monomers having a functionality greater than two, so that highly cross-linked polymers which are insoluble and infusible are obtained at a low degree of conversion. It is known that the greater the functionality of a monomer, the lower the degree of conversion at the gel point (or the point at which insolubility of the polymer sets in). This being the case, a discernible photographic image is obtainable by the process of the present invention at low light levels and in short periods of time when monomers of high functionality are employed. Monomers having a functionality higher than two are typified by: N,N'-alkylenebisacrylamides, secondary acrylamides, tertiary acrylamides, di- or trivalent metal salts of acrylic or methacrylic acid and the like. Such polyfunctional compounds are generally designated in the art as "cross-linking" agents and suitable examples for use in the process of the present invention are:

(1) alkylenebisacrylamides and their derivativse having the general formula:

(2) secondary acrylamides or derivatives thereof having the general formula:

(3) tertiary acrylamides or derivatives thereof having the general formula:

(4) and the divalent or trivalent metal salts of acrylic acid or its derivatives having the general formula:

where $n$ is greater than one and M may be calcium, barium, strontium, magnesium, zinc, or aluminum, and where the groups R, R', R" and R''' in all of the above formulas are alkyl, aryl, aralkyl or alkaryl groups such as methyl, ethyl, propyl, butyl, phenyl, benzyl, tolyl and the like, for example.

Furthermore, mixtures of monomers having a functionality of two with those having a functionality greater than two will have an average functionality greater than two and therefor will yield cross-linked, insoluble polymers. An example of such a mixture is acrylamide and N,N'-methylenebisacrylamide.

Only catalytic amounts of the organic sulfinic compounds are needed in the photo-redox catalyst system of the present invention for photopolymerization. Thus, photo-redox polymerization, according to the present invention, may be achieved by using concentrations of the organic sulfinic compound as small as $10^{-6}$ moles per liter. Hence, when measured against the quantity of the monomer, the amount of the organic sulfinic compound catalyst can be exceedingly small. As an example, I have used one-tenth of a millimole of organic sulfinic compound catalyst per liter of solution to achieve satisfactory photopolymerization. Higher concentrations may result in somewhat accelerated rates of photopolymerization. The minimum required concentration of photo-active dye, which is also a part of the catalyst system of the present invention and which is used in conjunction with the organic sulfinic compound, is approximately $10^{-7}$ moles per liter. As the dye concentration is increased above this minimum concentration, the sensitivity increases; however, the sensitivity may pass through a maximum as the dye concentration is further increased so that it may be desirable to avoid high dye concentrations ($10^{-2}$ moles per liter or more), especially when the photo-sensitive solution to be polymerized is of greater thickness than a very thin film. However, since the optical properties of the dye are dependent upon the quantities present as well as upon the intensity of the radiation employed, the criteria for determining the proper or practical quantities of dye and of organic sulfinic compound to be employed will be governed by considerations other than just the amount needed for catalyzing the photopolymerization reaction.

Figure 1:
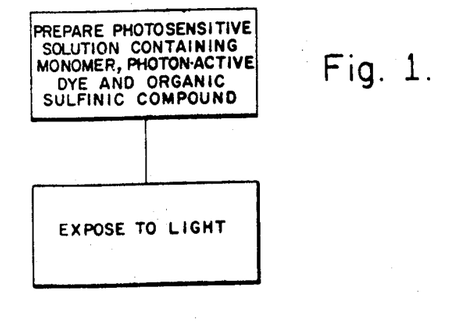
FIG. 1 is a flow chart representation of the process of the invention.

With reference to FIG. 1, it will be understood that the monomer, dye, and organic sulfinic compound may be brought together simultaneously or in any other order. Thus, the monomer and dye may be prepared together and the organic sulfinic compound may be added later thereto. Alternatively, the dye and organic sulfinic compound may be prepared together and the monomer later added thereto. It is also possible in some instances to prepare the monomer and the organic sulfinic compound together and later add the dye thereto.

The photopolymerization process of the present invention may be carried out in a solvent solution of the involved compounds. The particular solvent employed will depend upon the solubility of the monomer on one hand and the photo-redox catalyst system on the other. Thus, if both the monomer and the catalyst system are water soluble, such as in a system employing, for example, acrylamide as the monomer, and thionine as the dye, and sodium p-toluenesulfinate, an aqueous solution may be employed. Where a common solvent for the monomer and catalyst system is not available, different solvents which are miscible with each other may be employed. I have used as suitable solvents in the process of the present invention water, alcohols, polyhydric alcohols, ethers derived from polyhydric alcohols, ethyl ether, dioxane, ethylene dichloride, toluene, benzene, and the like. Furthermore, I have found glycerol, ethylene glycol, bis(2-methoxyethyl)ether or methanol to be useful in the process of the present invention as a solvent.

Dispersions may also be used in effecting the photopolymerization and resort to dispersions may be had where it is desirable to use an insoluble monomer or catalyst system. In general, however, I prefer not to use dispersions since the particulate matter tends to scatter the light or radiation used in the process of the present invention.

The pH of the reaction mixture of the present invention does not appear to be critical. I prefer to operate my reaction mixtures at a pH range of from about 5.5 to about 8.5. If the reaction mixture is too highly acid or too highly alkaline, the principal effect appears to be on the rate at which polymerization is initiated and completed as will be shown in greater detail hereinafter with reference to FIG. 2 and in connection with Example 2.

The temperature at which the reaction is carried out is not critical. However, it will be appreciated that since polymerization of some of the monomers which may be employed in the process of the present invention may be achieved by heating the monomer at an elevated temperature, restricting the reaction to photo-redox polymerization may be difficult if excessively high temperatures are employed or encountered.

The photopolymerization process of the present invention has particular utility wherever it is desired to form a hard, solid and/or permanent substance under the control of and in response to radiation. Thus, polymers having a desired predetermined shape may be formed by exposing the reaction mixture to a light pattern corresponding to the predetermined shape. I have also achieved the formation of photographic images by exposing a reaction mixture to a light image of a subject, the reaction mixture being disposed upon a film or suitable substrate therefor. After light-induced polymerization is achieved according to the invention, any unreacted monomer as well as other constituents of the reaction mixture which have not been irradiated may be inactivated or rendered insensitive to further photo-activation in some appropriate manner as by removing the unreacted compounds by dissolution in an appropriate solvent.

In order that any addition polymerization system attain a maximum degree of conversion in a given time, it is necessary that agents which tend to inhibit initiation or polymerization be removed or that their concentration be substantially reduced. Oxygen is known to react readily with free radicals and thus tends to inhibit addition polymerization. Although, as noted hereinbefore, the photo-redox catalyst system of the present invention appears to be substantially less sensitive to inhibition by oxygen than many catalyst systems disclosed in the prior art, considerable improvement of the over-all rate of polymerization in the process of the present invention can be achieved by the total elimination of oxygen or by the reduction of the oxygen content of the polymerizing materials to a substantially low concentration.

The following examples will serve to illustrate the practice of my invention although it is to be understood that the scope of the invention is not restricted thereto or thereby.

EXAMPLE 1

Solution (A)

A solution of monomers was prepared by dissolving 40 grams of acrylamide and 6 grams of N,N′-methylenebisacrylamide in about 45 ml. of distilled water and warming the same. To the warm solution 0.0032 gram of methylene blue was added in the form of 10 ml. of solution containing 0.032 gram of methylene blue per 100 ml. of aqueous solution. Additional distilled water was then added to the resulting solution to make about 100 ml. of solution. This solution was 40% wt./vol. in acrylamide, 6% wt./vol. in methylenebisacrylamide and approximately $10^{-4}$ molar in methylene blue. It was found to be indefinitely stable when stored in the dark. Methylene blue has the following structural formula:

In reference to the structural formula given in the description of this invention X=nitrogen in this case, Y=sulfur, R=N(CH$_3$)$_2$ and R′=N(CH$_3$)$_2$.

Solution (B)

An organic sulfinic compound solution was then prepared by adding 1.68 grams of sodium bicarbonate and 2.14 grams of sodium p-toluenesulfinate dihydrate (90%) to a sufficient quantity of distilled water to make 100 ml. of solution. This co-catalyst solution is approximately 0.2 molar in sodium bicarbonate and 0.1 molar in sodium p-toluenesulfinate.

Solution (C)

A photosensitive solution was prepared in the dark by mixing 5 ml. of the monomer solution (A) as prepared above and ½ ml. of the co-catalyst solution (B) as prepared above. Approximately 2.5 ml. of this photo-sensitive solution was placed in a vial and nitrogen gas containing a maximum of 0.4% by volume of O$_2$ was bubbled through the solution in the dark for one hour. The solution was then exposed to white light having an approximate intensity of $10^{-4}$ watts per cm.$^2$ at the sample interface. The solution set to a clear gel in about one second exposure with the development of a strong exothermic reaction. It was found that if nitrogen gas is not bubbled through the photo-sensitive solution, then, on exposure to the same light intensity the solution sets to a clear gel in 90 seconds.

The step of bubbling with nitrogen gas should be accomplished in complete darkness. It has been found that if this step is allowed to take place in a dark, windowless room but with diffuse light entering through an open door leading to a fluorescent-lighted corridor, then the entire-photo-sensitive solution will set up to a gel during the one hour of nitrogen gas bubbling.

EXAMPLE 2

Solution (A)

A series of buffer solutions was prepared from aqueous stock solutions of 0.1 molar sodium borate or 0.1 molar citric acid and 0.2 molar disodium hydrogen phosphate as follows:

(a) For pH 5—
  103 ml. of the disodium phosphate solution
  97 ml. of the citric acid solution
(b) For pH 6—
  126.3 ml. of the disodium phosphate solution
  73.7 ml. of the citric acid solution
(c) For pH 7—
  164.7 ml. of the disodium phosphate solution
  35.3 ml. of the citric acid solution
(d) For pH 8—
  194.5 ml. of the disodium phosphate solution
  5.5 ml. of the citric acid solution
(e) For pH 9.2—0.1 molar aqueous sodium borate solution.

Solution (B)

Using the above buffer solutions, a series of monomer solutions was prepared by mixing 40 grams of acrylamide, 6 grams of N,N′-methylenebisacrylamide, 10 ml. of aqueous $10^{-3}$ molar thionine solution with a sufficient quantity of each one of the buffer solutions (A) to make about 80 ml. of solution. The solutions were warmed in the dark to obtain homogeneity and then an additional quantity of buffer solution was added to make 100 ml. of solution.

The solutions thus obtained were 40% wt./vol. in acrylamide, 6% wt./vol. in methylenebisacrylamide and $10^{-4}$ molar in thionine. Thionine has the following structural formula:

In reference to the structural formula given in the description of this invention X=nitrogen in this case, Y=sulphur, R=NH$_2$ and R'=NH$_2$.

Solution (C)

A series of photo-sensitive solutions was then prepared by mixing in the dark 5 ml. of each of the buffered monomer solutions (B) as prepared above with ½ ml. of 0.1 molar sodium p-toluenesulfinate in distilled water.

Figure 2:
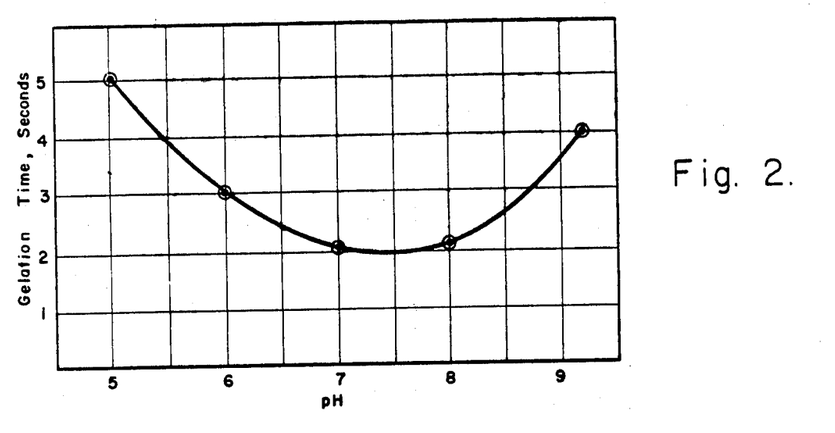
FIG. 2 is a graphical representation of the time-to-gelation versus pH of various solutions useful in the process of the invention.

Nitrogen gas containing a maximum of 0.4% by volume of $O_2$ was bubbled through the resulting solutions (C) at the same rate for each solution and in complete darkness. Each solution was then exposed to white light having an approximate intensity of $10^{-4}$ watts per cm.$^2$ at the sample surface and the time required for the solution to set to a solid gel was noted. In FIG. 2 the graphical representation of time-to-gelation versus pH shows that although the pH effect is small, there is a tendency for a minimum gelation time to occur at pH between 7 and 8. Generally, different monomer and photo-redox systems show somewhat different pH effects. The following observations were made with respect to the solutions (C) described in this example:

| Solution | pH | Observations |
|---|---|---|
| C-1 | 5 | Gels in 5 seconds—extremely mild exothermic reaction—gel hardens slowly. |
| C-2 | 6 | Gels in 3 seconds—mild exothermic reaction—gel hardens slowly. |
| C-3 | 7 | Gels in 2 seconds—strong exothermic reaction—gel hardens quickly. |
| C-4 | 8 | Gels in 2 seconds—very strong exothermic reaction—gel hardens very quickly. |
| C-5 | 9.2 | Gels in 4 seconds—very strong exothermic reaction—gel hardens quickly. |

EXAMPLE 3

Solution (A)

A buffer solution having a pH of 8 was prepared by mixing 194.5 ml. of 0.2 molar aqueous disodium hydrogen phosphate solution with 5.5 ml. of 0.1 molar aqueous citric acid solution.

Solution (B)

A monomer solution was then prepared by mixing 40 grams of acrylamide, 6 grams of N,N'-methylenebisacrylamide, and 0.025 grams of thionine in a flask to which was added enough of the above buffer solution (A) to make a volume of about 80 ml. The flask was warmed and stirred in the dark to obtain a homogeneous solution. Additional buffer solution was added to bring the total volume of the solution up to 100 ml.

Solution (C)

A photo-sensitive solution was prepared by mixing in the dark 5 ml. of the monomer solution (B) as described above with ½ ml. of 0.1 molar aqueous sodium p-toluenesulfinate solution. The resulting solution (C) was then placed in a vial and nitrogen gas containing a maximum of 10 p.p.m. of $O_2$ was bubbled through the solution for 15 minutes in the dark. At this point 1 ml. of acrylonitrile (with the hydroquinone derivative inhibitor therein unremoved) was injected into the vial containing the photo-sensitive solution. On mixing, a clear solution resulted which was exposed to white light having an intensity of about $10^{-4}$ watts per cm.$^2$ at the sample surface. The solution was converted into a firm, clear gel upon eight minutes of exposure with the development of an exothermic reaction. Though considerably retarded by the inhibitor in the acrylonitrile, polymerization did occur.

EXAMPLE 4

Solution (A)

A monomer solution was prepared by heating and stirring 4 grams of acrylamide, 0.6 gram of N,N'-methylenebisacrylamide, and 5 grams of 97% glycerol in subdued light to obtain a clear solution.

Solution (B)

0.8 ml. buffer solution having a pH of 8 was prepared as in Example 3 (Solution A) and containing 1.0 ml. of $10^{-3}$ molar aqueous thionine solution was added to solution (A) above to obtain a homogeneous solution containing about 15% water and being about $10^{-4}$ molar in thionine.

Solution (C)

A photo-sensitive solution was prepared from 5 ml. of the buffered monomer solution (B) above and ½ ml. of 0.1 molar aqueous sodium p-toluenesulfinate solution. The solutions were mixed in the dark and nitrogen gas containing a maximum of 10 p.p.m. of $O_2$ was bubbled through the solution for 15 minutes in the dark. The material was exposed to white light having an intensity of about $10^{-4}$ watts per cm.$^2$ at the sample surface. An exposure of one second resulted in a firm gel with the immediate development of a very strong exothermic reaction. Upon drying in a desiccator the firm, flexible gel dried to a tough, clear plastic.

EXAMPLE 6

Solution (A)

A solution of barium diacrylate was prepared by adding 2 moles of acrylic acid to 1 mole of barium hydroxide suspended in water and filtering the resulting hazy solution. It was found that the solution could be made considerably more stable by employing a slight excess of acrylic acid to give a slightly acid solution. The final solution was diluted with water to give a solution containing 0.489 gram of barium diacrylate for each 1 ml. of solution, or 48.9% wt./vol. of barium diacrylate.

Solution (B)

A photo-redox catalyst solution was prepared by dissolving 2.14 grams of sodium p-toluenesulfinate dihydrate (90%) and 0.025 gram of thionine in about 75 ml. of distilled water. The solution was then poured into a flask and additional distilled water was added to give 100 ml. of solution which was approximately 0.1 molar in sodium p-toluenesulfinate and $10^{-3}$ molar in thionine.

Solution (C)

A photo-sensitive solution was then prepared by mixing in the dark 5 ml. of the barium diacrylate solution (A) above and 0.5 ml. of the photo-redox catalyst solution (B) as prepared above. The solution was placed in a vial and exposed to red light from a monochromator peaking sharply at 6060 A. wavelength. The intensity of the light, as measured with a thermopile, was $5.4 \times 10^{-6}$ watts per cm.$^2$ at the sample surface. A heavy, solid, opaque deposit of polymer was obtained on the inner surface of the vial in about 45 seconds exposure time.

It was calculated, therefore, that the total exposure was $2.43 \times 10^{-4}$ watt-seconds per cm.$^2$ or $2.43 \times 10^3$ ergs per cm.$^2$. Since radiation of wavelength 6060 A. has an energy of $3.27 \times 10^{-12}$ ergs per photon, the photon flux required to form the heavy opaque polymer deposit was $7.43 \times 10^{14}$ photons per cm.$^2$.

EXAMPLE 6

Solution (A)

A photo-redox catalyst solution was prepared by dissolving 2.14 grams of sodium p-toluenesulfinate dihydrate and 0.025 gram of thionine in glycerol (97%) in flask.

The ingredients were dissolved by stirring and warming to about 50° C. until a homogeneous solution was secured, after which additional glycerol was added to make up 100 ml. of solution which is 0.1 molar in sodium p-toluenesulfinate and $10^{-3}$ molar in thionine and is indefinitely stable.

Solution (B)

A solution of barium diacrylate was prepared in glycerol (97%) by first dissolving barium hydroxide in glycerol and removing water to form the glycerate, then adding a stoichiometric equivalent of acrylic acid to form barium diacrylate. The solution was 35% wt./vol. in barium diacrylate and contained about 0.35 gram of barium diacrylate for each 1 ml. of glycerol solution.

Solution (C)

A solution of barium diacrylate was prepared in ethylene glycol by first dissolving barium hydroxide in ethylene glycol and removing water of crystallization by warming under a vacuum, then adding a stoichiometric equivalent of acrylic acid to form barium diacrylate. The solution was 41.7% wt./vol. in barium diacrylate and contained 0.417 gram of barium diacrylate for each 1 ml. of ethylene glycol solution.

Solution (D)

(1) A photo-sensitive solution was then prepared by adding and mixing in the dark 5 ml. of the barium diacrylate solution (B) above and ½ ml. of the photo-redox catalyst solution (A) above to obtain a homogeneous solution containing approximtely 31.8% wt./vol. barium diacrylate, $10^{-2}$ molar sodium p-toluenesulfinate and $10^{-4}$ molar thionine. The solution was placed in a vial and nitrogen gas containing a maximum of 10 p.p.m. of $O_2$ was bubbled through the solution for 20 minutes in the dark. The solution was exposed to white light having an intensity of approximately $10^{-4}$ watts per cm.$^2$ at the sample interface. Opacity and gelation of the solution occurred in 30 seconds accompanied by a mild exothermic reaction.

(2) A photo-sensitive solution was prepared by mixing 5 ml. of the barium diacrylate solution (C) above and ½ ml. of the photo-redox catalyst solution (A) above in the absence of light until a homogeneous solution was secured containing approximately 38% wt./vol. barium diacrylate, $10^{-2}$ molar sodium p-toluenesulfinate, and $10^{-4}$ molar thionine. The solution was placed in a vial and nitrogen gas containing a maximum of 10 p.p.m. of $O_2$ was bubbled through the solution for 30 minutes in the dark. The solution was exposed to white light having an intensity of about $10^{-4}$ watts per cm.$^2$ at the sample interface. Opacity and gelation of the solution occurred in 10 seconds exposure with very little exothermic reaction being detectable. It was found that when no attempt was made to exclude oxygen from the system, opacity and gelation of the solution occurred in 90 seconds exposure to white light of $10^{-4}$ watts per cm.$^2$ intensity.

EXAMPLE 7

Solution (A)

A photo-redox catalyst solution was prepared by dissolving 2.14 grams of sodium p-toluenesulfinate dihydrate (90%) and 0.025 gram of thionine in 75 ml. of 97% glycerol by warming and stirring until a homogeneous solution was secured. The solution was transferred to a flask and additional 97% glycerol was added to bring the volume to 100 ml. The photo-redox catalyst solution is approximately 0.1 molar in sodium p-toluenesulfinite and $10^{-3}$ molar in thionine.

Solution (B)

A solution of strontium diacrylate was prepared by adding dropwise 50 grams of acrylic acid to a warmed suspension of 51 grams of strontium carbonate in 225 ml. of distilled water. When the reaction was complete, the hazy solution was diluted with water and filtered until a clear solution was obtained containing 0.354 gram of strontium diacrylate per 1 ml. of solution, or a 35.4% wt./vol. of strontium diacrylate. It was found that this solution remained clear indefinitely on storage in a refrigerator in the dark.

Solution (C)

A photo-sensitive solution was prepared by mixing 5 ml. of the strontium diacrylate solution (B) above and ½ ml. of the photo-redox catalyst solution (A) above in the dark to give homogeneous solution. A portion was placed in a vial and illuminated with white light having an intensity of approxmately $10^{-4}$ watts per cm.$^2$ at the sample interface. The solution clouded and was found to gel upon 75 seconds exposure.

A portion of the above solution (C) was placed in a vial and nitrogen gas containing a maximum of 10 p.p.m. of $O_2$ was bubbled therethrough for 30 minutes in the dark. Upon exposure to white light having an approximate intensity of $10^{-4}$ watts per cm.$^2$ at the sample interface, the solution was found to cloud and gel in 7 seconds with the development of a mild exothermic reaction.

EXAMPLE 8

Solution (A)

A solution of N methylol - N,N' - methylenebisacrylamide having the structural formula was prepared by heating at 50° C. for three hours 15 grams of N,N' - methylenebisacrylamide, 13.1 ml. of 37% formaldehyde solution, 22.5 ml. of distilled water, and 0.5 gram of potassium hydroxide. The clear solution thus obtained contained about 30% methylenebisacrylamide. Nitrogen gas was bubbled through the solution to eliminate some of the excess formaldehyde. Then sufficient thionine was added to make this solution approximately $10^{-4}$ molar in thionine.

Solution (B)

A photo-sensitive solution was prepared by mixing in the dark 5 ml. of the N methylol - N,N' - methylenebisacrylamide solution (A) above and ½ ml. of 0.1 molar aqueous sodium p-toluenesulfinate solution. Nitrogen gas containing a maximum of 10 p.p.m. of $O_2$ was bubbled through the solution in the dark for 15 minutes. The solution was then exposed to white light having an intensity of about $10^{-4}$ watts per cm.$^2$ at the sample surface. An opaque solid gel was formed in 28 seconds with the development of an exothermic reaction.

EXAMPLE 9

Solution (A)

A buffer solution having a pH of about 8 was prepared by mixing 194.5 ml. of 0.2 molar aqueous disodium hydrogen phosphate solution and 5.5 ml. of 0.1 molar aqueous citric acid solution.

Solution (B)

A monomer solution was then prepared by mixing 40 grams of acrylamide, 6 grams of N,N'-methylenebisacrylamide, and 0.003 gram of methylene blue in a flask and adding sufficient of the above buffer solution (A) to make a volume of about 80 ml. The flask was warmed and stirred in the dark and upon obtaining complete solution of the ingredients, additional buffer solution (A) was added to bring the total volume up to 100 ml.

Solution (C)

A photo-sensitive solution was then prepared by mixing in the dark 5 ml. of the monomer solution (B) above, ½ ml. of 0.1 molar aqueous sodium p-toluenesulfinate, and 2.4 ml. of 97% glycerol.

The homogeneous photo-sensitive solution was next placed in a cylindrical cell made of poly(methyl methacrylate) plastic so that the photo-sensitive solution covered the flat bottom of the cell to a depth of about 2 millimeters. Nitrogen gas containing a maximum of 10 p.p.m. of $O_2$ was continuously passed through the cell in the dark over the surface of the photo-sensitive solution for 45 minutes.

A photographic negative of a National Bureau of Standards resolution test chart was provided so that the entire test chart was reduced in size to occupy an area of about 2 cm. by 2 cm. This negative was placed over the output end of a pink ruby laser having a rod radius of about one centimeter. Upon exciting the laser to produce radiations at 6943 A. wavelength, with an energy of approximately one joule per pulse, the coherent planar light obtained was passed through the negative and then reflected from a 99% reflective mirror upwards through the bottom of the plastic cell containing the photo-sensitive solution (C). Upon exposure of the photo-sensitive solution (C) to a single (millisecond) laser pulse, a faithful reproduction of the negative was secured in the photo-sensitive material as a completely gelled bead covering the area of the laser beam. The image was discernible instantaneously, evidencing the occurrence of polymerization in a small fraction of a second after exposure. However, to avoid overexposing the image and to obtain a more accurate reproduction of the negative, it was found desirable to attenuate the ruby radiation by a factor of 100 to 1,000 or more.

Since the laser output in this example is one joule or $10^7$ ergs and since the laser radiation is 6943 A. wavelength, which contains $2.86 \times 10^{-12}$ ergs per photon, the total number of photons per pulse is $3.5 \times 10^{18}$ photons. The area covered by the laser beam was then about 3.14 cm.$^2$, so the photon flux for this example was approximately $10^{18}$ photons per cm.$^2$.

EXAMPLE 10

Solutions which were about 5 molar in acrylamide, 0.35 molar in N,N'-methylenebisacrylamide, $10^{-4}$ molar in methylene blue, and $10^{-2}$ molar in a sulfinic compound, identified hereinbelow, were prepared in a buffer solution having a pH of approximately 8 as described in Example 2, solution (A-d). Nitrogen gas containing a maximum of 10 p.p.m. of $O_2$ was passed through each of the solutions thus obtained for about ½ hour. The solutions were then illuminated with light from a tungsten lamp at an intensity of approximately 310 metercandles or $4.6 \times 10^{-5}$ watts per cm.$^2$. The sulfinic compounds which were used in preparing these solutions and the period of illumination at which gelation occurred are as follows:

|  | Sec. |
|---|---|
| Sodium p-toluenesulfinate | 14 |
| Sodium benzenesulfinate | 17 |
| 4-acetamidobenzenesulfinic acid | 18 |
| 5-salicylsulfinic acid | 21 |
| Hydroxymethyl p-tolyl sulfone | 6 |

It was found that polymerization failed to occur even after two hours of illumination under the same conditions but with the sulfinic compound omitted from the solutions.

EXAMPLE 11

Solutions which were approximately 5 molar in acrylamide, 0.35 molar in N,N'-methylenebisacrylamide, $10^{-2}$ molar in sodium p-toluenesulfinate, and $10^{-4}$ molar in dye, identified hereinbelow, were prepared in a buffer solution having a pH of about 8 as described in Example 2, solution (A-d). After nitrogen gas containing a maximum of 10 p.p.m. of $O_2$ was passed through the solutions for about ½ hour, they were then illuminated by means of a tungsten lamp at a light intensity of 870 metercandles or $1.3 \times 10^{-4}$ watts per cm.$^2$. The dyes used in these solutions and the periods of illumination required for gelation are as follows:

|  | Sec. |
|---|---|
| Methylene blue | 2.5 |
| Thionine | 17 |
| Acridine orange | 16 |
| Rose bengal | 76 |
| Phenosafranine | 10 |
| Fluorescein | 30 |
| Azure B | 4 |
| Thioflavin T | 37 |
| Capri blue | 397 |
| Azure B plus acridine orange | 3 |
| Methylene blue plus phenosafranine | 2 |

Structural formulas for dyes of the preferred character, capable of imparting color in a manner known to the art, which have not been given before in these examples are given below. In reference to the structural formula given in the description of this invention, the designation of the symbols X, Y, R and R' are given along with each structural formula:

ACRIDINE ORANGE (NO)

X=CH
Y=NH
R=N(CH$_3$)$_2$
R'=N(CH$_3$)$_2$

ROSE BENGAL

Y=oxygen
R=O (oxonium)
R'=OH (hydroxyl)

PHENOSAFRANINE

X=nitrogen

Y=N—⟨⟩

R=NH$_2$
R'=NH$_2$

FLUORESCEIN

Y=oxygen
R=O (oxonium)
R'=OH (hydroxyl)

AZURE B

X=nitrogen
Y=sulfur
R=NHCH$_3$
R'=N(CH$_3$)$_2$

CAPRI BLUE

X=nitrogen
Y=oxygen
R=N(CH$_3$)$_2$
R'=N(CH$_3$)$_2$

With omission of the dye, gelation was found to occur only after about 600 sec. of illumination under the same conditions. With omission of both the dye and the sodium place even after several hours of illumination under the same conditions.

EXAMPLE 12

Solutions which were 5 molar in acrylamide and 0.35 molar in N,N'-methylenebisacrylamide and which contained various proportions of both methylene blue and sodium p-toluenesulfinate, as hereinafter indicated, were prepared in a buffer solution having a pH of about 8 prepared as described in Example 2, solution (A–d). Nitrogen gas containing a maximum of 10 p.p.m. of O$_2$ was passed through the solutions for ½ hour. The solutions were then illuminated with light from a tungsten lamp at an intensity of 310 metercandles or $4.6 \times 10^{-5}$ watts per cm.$^2$. The following results were obtained:

(a) A solution which was $10^{-7}$ molar in methylene blue and $10^{-4}$ molar in sodium p-toluenesulfinate became quite viscous after 4½ min. and formed a soft gel within 7½ min. of illumination.

(b) A solution which was $10^{-7}$ molar in methylene blue and 0.1 molar in sodium p-toluenesulfinate became quite viscous after 3½ min. and formed a cohesive gel within 6½ min. of illumination.

(c) A solution which was $4 \times 10^{-6}$ molar in methylene blue and $10^{-4}$ molar in sodium p-toluenesulfinate gelled completely within 41 sec. of illumination.

(d) A solution which was $4 \times 10^{-6}$ molar in methylene blue and 0.1 molar in sodium p-toluenesulfinate gelled completely within 14 sec. of illumination.

(e) A solution which was $10^{-4}$ molar in methylene blue and $4 \times 10^{-6}$ molar in sodium p-toluenesulfinate was partially formed into a soft gel after 20 min. of illumination but remained incompletely gelled after 1 hr. of illumination.

(f) A solution which was $10^{-4}$ molar in methylene blue and $10^{-4}$ molar in sodium p-toluenesulfinate gelled completely within 8 sec. of illumination.

(g) A solution which was $10^{-4}$ molar in methylene blue and 0.1 molar in sodium p-toluenesulfinate gelled completely within 6 sec. of illumination.

(h) A solution which was $10^{-2}$ molar in methylene blue and $10^{-4}$ molar in sodium p-toluenesulfinate displayed no apparent polymerization after 45 min. of illumination. After 10 min. of illumination at a light intensity of 870 metercandles or $1.3 \times 10^{-4}$ watts per cm.$^2$, a gel was found to form on the illuminated surfaces, but the bulk of the solution remained fluid.

(i) A solution which was $10^{-2}$ molar in methylene blue and 0.1 molar sodium p-toluenesulfinate formed a polymer gel at the illuminated surfaces thereof after about 10 min. of illumination, but the bulk of the solution remained fluid.

EXAMPLE 13

Figure 3:
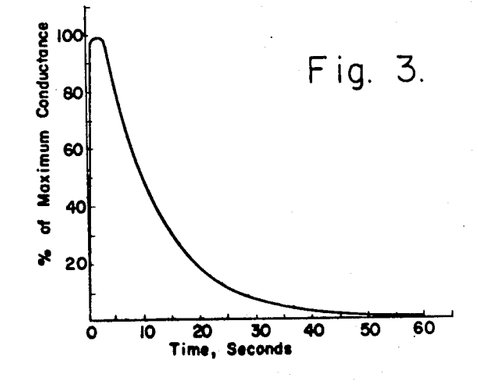
FIG. 3 is a graphical representation of the conductance of a photocell versus the time of illumination through a photo-sensitive solution in which an insoluble, light-scattering polymer is being formed according to the invention.

(a) An aqueous solution, through which nitrogen gas containing a maximum of 10 p.p.m. of O$_2$ was passed, and which was 2 molar in barium diacrylate, $10^{-3}$ molar in sodium p-toluenesulfinate, and $6 \times 10^{-5}$ molar in thionine and had a pH of 5.5, was disposed in a container having parallel glass windows so as to provide a solution thickness of $\frac{1}{16}''$. This container was then irradiated with light having a wavelength of approximately 6000 A. The light transmitted through the container and solution was measured with a device manufactured by the General Electric Company identified and sold to the trade as photoconductive cell B425. The conductance of this photocell is approximately proportional to the light intensity. Upon irradiation, the conductance of the photoconductive cell rose to a maximum within 2 sec. and then decreased due to the formation of insoluble barium diacrylate polymer, which scatters the incident light. The conductance is shown as a function of illumination time in the graph of FIG. 3.

(b) The above procedure was repeated at light intensities corresponding to approximately 72%, 59% and 11% of the original intensity. The time required for the conductivity ($\Sigma$) to decrease to 0.50, 0.25 and 0.10 times its maximum value is given below for each light intensity:

| Relative light intensity, percent | Time, sec. | | |
|---|---|---|---|
| | $\Sigma=0.50$ $\Sigma$max. | $\Sigma=0.25$ $\Sigma$max. | $\Sigma=0.10$ $\Sigma$max. |
| 100 | 9.4 | 15 | 24 |
| 72 | 12 | 19 | 31 |
| 59 | 14 | 23 | 37 |
| 11 | 61 | 100 | 155 |

EXAMPLE 14

A solution was prepared as described in Example 13(a) and various portions of the solution were irradiated in a similar manner, except that each portion was irradiated with light having a different wavelength. In each case the same photoconductive cell B425 was used to measure the transmitted light, and the time required for the conductivity ($\Sigma$) of this cell to decrease to 0.50, 0.25 and 0.10 times its maximum value was noted. The values obtained have the general relationship of those shown below:

| Wavelength, A. | Approx. relative light intensity, percent | Time, sec. | | |
|---|---|---|---|---|
| | | $\Sigma=0.50$ $\Sigma$max. | $\Sigma=0.25$ $\Sigma$max. | $\Sigma=0.10$ $\Sigma$max. |
| 6,500 | 100 | 60 | 106 | 169 |
| 6,000 | 100 | 19 | 28 | 40 |
| 5,500 | 100 | 25 | 40 | 59 |
| 5,000 | 60 | 171 | 308 | ---- |
| 5,000 | 100 | [1]103 | [1]185 | ---- |

[1] Estimated.

It is apparent that a maximum in the action spectrum lies in the region of 6000 A. This corresponds to a maximum at 6000 A. in the absorption spectrum of thionine, the dye which was used.

EXAMPLE 15

A solution which was 0.5 M in disodium maleate, 2.5 molar in acrylamide, 0.18 molar in N,N'-methylenebisacrylamide, $10^{-4}$ molar in methylene blue, and $10^{-2}$ molar in sodium p-toluenesulfinate was prepared in a buffer solution with a pH of about 8 prepared as described in Example 2 (A-d). Illumination of the solution was carried out as described in Example 11 after passing nitrogen gas containing a maximum of 10 p.p.m. of $O_2$ through the solution for ½ hour. A polymer gel with a cloudy appearance formed within 14 sec. Further illumination was found to heighten the light-scattering property of the gel.

EXAMPLE 16

Solution (A)

An aqueous dye solution of 0.02 g. of methylene blue was made basic with sodium hydroxide and extracted immediately with chloroform. The chloroform solution was washed with water, and p-toluene sulfonic acid was added. Excess acid was then removed by washing the chloroform solution with water after which the chloroform was evaporated. The residual p-toluenesulfonate salt of the dye was then dissolved in 50 ml. of bis(2-methoxyethyl) ether.

Solution (B)

A monomer solution was prepared by dissolving 15 g. of acrylamide and 2 g. of N,N'-methylenebisacrylamide in sufficient bis(2-methoxyethyl)ether to make 50 ml. of solution.

Solution (C)

Another solution was prepared consisting essentially of 1 g. of sodium p-toluenesulfinate dihydrate in 50 ml. of bis(2-methoxyethyl)ether.

Solution (D)

A photo-sensitive solution was then prepared by mixing 0.5 ml. of the dye solution (A), 4 ml. of the monomer solution (B), and 0.5 ml. of the sodium p-toluenesulfinate solution (C). After being purged with nitrogen gas containing a maximum of 10 p.p.m. of $O_2$, the solution (D) was irradiated with light from a tungsten lamp at an intensity of 310 metercandles or $4.6 \times 10^{-5}$ watts per $cm.^2$. White polymer began to precipitate within a few seconds, and a heavy precipitate was obtained within two minutes.

EXAMPLE 17

Butyl tin trichloride was hydrolyzed with water until all of the chlorine had been removed to give a product which was substantially butyl tin oxyhydroxide. This product was thoroughly dried in a vacuum desiccator. To a suspension of the dried butyl tin oxyhydroxide in toluene was added sufficient acrylic acid calculated to form

[BuSn(OCOCH=CH$_2$)$_2$]$_2$—O and the suspension was then heated until a clear solution was obtained. The toluene solution was dried over anhydrous sodium sulfate. The solution had a solids content of 55.5% by weight.

A photocatalyst solution was prepared by dissolving 2.14 g. sodium p-toluenesulfinate dihydrate and 0.025 g. thionine in 100 ml. of anhydrous methanol to form a homogeneous solution that was 0.1 molar in sodium p-toluenesulfinate and $10^{-3}$ molar in thionine.

In the dark, ½ ml. of the above photocatalyst was mixed with 3 ml. of the above butyl tin oxyacrylate solution. A vacuum was applied to this solution followed by vigorous bubbling for twenty minutes with a stream of nitrogen gas containing a maximum of 10 p.p.m. of $O_2$. By this treatment the solution was concentrated and substantially all of the methanol removed.

The clear homogeneous solution was exposed to light having an intensity of about $10^{-4}$ watts per $cm.^2$ at the sample surface. The solution gelled in 60 seconds to a firm and tough mass which was slightly elastic and clear. A very slight exothermic reaction developed during exposure.

EXAMPLE 18

Dibutyl tin dichloride was hydrolyzed with water to produce dibutyl tin oxide. The dibutyl tin oxide, after drying, was suspended in ether and two moles of acrylic acid added for each one mole of dibutyl tin oxide. On heating, the dibutyl tin oxide reacted and dissolved to give an ether solution of dibutyl tin diacrylate. The ether solution was dried with anhydrous sodium sulfate to give a solution of about 50% solids. The dibutyl tin diacrylate produced in this manner is a very viscous liquid, and when solvent-free, is difficult to crystallize.

To 4 ml. of the above ether solution of dibutyl tin diacrylate was added ½ ml. of the photocatalyst in methanol as prepared in Example 17. In the dark, a vigorous stream of nitrogen gas containing a maximum of 10 p.p.m. of $O_2$ was passed through the ether solution for one hour. In this time all the ether and most of the methanol was removed. A vacuum was then applied to remove all the methanol. A viscous, methanol- and ether-free solution resulted which was maintained under a blanket of nitrogen.

Upon exposure to light having an intensity of about $10^{-4}$ watts per $cm.^2$, the liquid gelled in 15 sec. with the development of a very strong exothermic reaction. The gel was extremely hard and very tough. It was slightly hazy. The composition of this example was anhydrous and substantially free of any solvent.

EXAMPLE 19

A convenient device for measuring the time-to-gelation or to immobilization of a polymerizable material was prepared and consisted of two small glass plates separated by a peripheral shim or spacer cut out of plastic sheet such as 5 mil thick Mylar (polyethylene terephthalate). Measurements are made by disposing the photo-sensitive solution between the plates and constantly moving the top plate relative to the shim and bottom plate while noting the time when motion is arrested due to gelation or immobililation of the polymerizable material contained between the plates and within the shim.

Solution (A)

A photo-sensitive solution was prepared as follows according to the process of the present invention by dissolving 15 grams of acrylamide and 0.25 gram of N,N'-methylenebisacrylamide by gentle heating in distilled water and 25 grams of glycerol in a 50 ml. volumetric flask. The photocatalyst ingredients consisting of 1.07 grams of sodium p-toluenesulfinate dihydrate and 0.0043 gram of methylene blue were added and dissolved in the dark with agitation and gentle warming. Thereafter, sufficient additional water was added to bring the volume up to 50 ml.

Solution (B)

For purposes of comparison, 50 ml. of a solution was prepared in the dark according to the directions given in Example 4 of U.S. Pat. 2,875,047 to Oster.

The solutions (A and B) were poured between shimmed glass plates in two cells, respectively, as described above. While the upper plate was in motion, the solution was uniformly illuminated with light from a 100-watt tungsten filament lamp placed at a distance of 10 inches from the plate.

For the cell containing Solution (A), motion was arrested after 30 seconds of exposure time. For the cell containing Solution (B), motion was arrested after 242 sec. of exposure time. Therefore, Solution (A) polymerized about eight times faster than Solution (B).

EXAMPLE 20

Another experiment was performed in order to determine the time-to-gelation of polymerizable monomer compositions according to the present invention in comparison with those of the prior art.

Solution (A)

A light-sensitive composition made according to the process of the present invention was prepared by gently heating and stirring 60 grams of acrylamide, 2.33 grams of N,N'-methylenebisacrylamide, and 40 grams of distilled water. Then 0.54 gram of silver benzenesulfinate and 0.34 ml. $10^{-2}$ molar methylene blue solution were added in the dark. After agitation and warming in the dark, the solution was filtered to remove a small amount of undissolved silver benzenesulfinate.

Solution (B)

An additional light-sensitive composition made according to the process of the present invention was prepared by gently heating and stirring 60 grams of acrylamide, 2.33 grams of N,N'-methylenebisacrylamide, and 40 grams of distilled water. Then 0.064 gram sodium p-toluenesulfinate dihydrate and 0.34 ml. $10^{-2}$ molar methylene blue solution were added in the dark. After agitation in the dark, a clear homogeneous solution was obtained.

In order to secure a comparison with the compositions of this invention and those of the prior art, a solution (hereinafter identified as Solution (C) was prepared according to directions given in Example XIII of the aforementioned U.S. Pat. 3,075,907 to Levinos.

The solutions (A, B, and C) were placed in respective vials and exposed to light. In one run the solutions were exposed to a 500-watt tungsten filament lamp placed 7 inches from the vial according to the directions of Levinos. In another run, each vial was flushed by bubbling in a stream of nitrogen gas containing a maximum of 10 p.p.m. of $O_2$ for ½ hour prior to exposure to a beam of light from a tungsten filament lamp having an intensity at the via surface of $1.3 \times 10^{-4}$ watts per cm.$^2$. The times given below for Solution (A) and Solution (B) are the times at which gelation appeared to be completed while the times given for Solution (C) are only those at which the start of gelation could be observed.

| Conditions | Time to gelation, sec. | | |
|---|---|---|---|
| | Solution (A) | Solution (B) | Solution (C) |
| I. 500 watt lamp at 7 inches | 17.5 | 11 | 420 |
| II. Flushed with $N_2$:$1.3 \times 10^{-4}$ watts per cm.$^2$ | 5 | 5 | 180 |

Under Condition I, Solution (A) was thus found to be at least 24 times faster than Solution (C) and Solution (B) was found to be at least 38 times faster than Solution (C). Under Condition II, Solutions (A) and (B) were found to be at least 36 times faster than Solution (C).

Having described and illustrated the present embodiment of this invention, improvement and/or discovery in the art in accordance with the patent statutes, it will be apparent that some modifications and variations including mixtures of the embodied components, as claimed, may be made without departing from the spirit and scope thereof. The specific embodiments described are given by way of examples illustrative of the changes and improvement discovered applicable herein and which are to be construed or limited only by the terms of the appended claims.

What is claimed is:

1. The process of photopolymerizing a photopolymerizable vinyl system which is inactive in the dark and contains:
    (a) a photopolymerizable vinyl monomer in combination with
    (b) a photo-activatable catalyst system comprised of:
        (1) an organic photo-oxidant dye having an oxidation potential active to radiation absorbed from ambient light in the visible portion of the spectrum over the wavelength range of from about 3800 A. to about 7200 A. to form an activated, oxidant, electron acceptor state and being selected from compounds of the formula where R carries a positive charge and is an imonium, alkylimonium, dialkylimonium or oxonium group; R' is hydrogen or an amino, alkylamino, dialkylamino, or hydroxyl group; X is nitrogen or substituted carbon; Y is sulfur, oxygen or substituted nitrogen; and $A^\ominus$ is an anion; in combination with,
        (2) an organic sulfinic compound capable of reacting with said dye when in said activated state to generate free radicals for initiating solid state polymerization of said vinyl monomer,
    which comprises exposing said system to absorb radiations in said wavelength range for a period sufficient to effect visible solid state polymerization in said system.

2. The process of claim 1 wherein said organic sulfinic compound is selected from the group consisting of one or more free organic sulfinic acids, salts and organic esters of such acids, and adducts of such acids with one or more carbonyl compounds.

3. The invention according to claim 1 wherein a cross-linking agent is utilized in conjunction with said vinyl monomer system.

4. The process of photopolymerizing a photopolymerizable vinyl monomer system comprising the steps of:
    preparing a solution containing said vinyl monomer and a photo-redox polymerization initiating catalyst comprising a photo-oxidant dye inactive in the dark and capable of imparting color and functioning as an oxidant, electron acceptor when activated by absorbing a photon from visible ambient light over the wavelength range of from 3800 A. to about 7200 A. and being selected from compounds of the formula:

where R carries a positive charge and is an immonium, alkylimonium, dialkylimonium, or oxonium group, R' is hydrogen, or an amino, alkylamino, dialkylamino or hydroxyl group; X is nitrogen or substituted carbon; Y is sulfur, oxygen or substituted nitrogen; and $A^\ominus$ is an anion;
    in combination with an organic sulfinic compound capable of reacting with said activated oxidant to generate free radical initiators of polymerization, and
    irradiating said system with radiation of a wavelength in the range of from about 3800 A. to about 7200 A. to effect visually observable polymerization in said system.

5. The process of claim 4 wherein said vinyl monomer system contains a cross-linking agent.

6. The process of claim 4 wherein the photooxidant is a photo-active dye having the said characteristic formula and the said organic sulfinic compound is selected from the group consisting of one or more free organic sulfinic acids, salts and organic esters of such acids, and adducts of such acids with one or more carbonyl compounds.

7. The process of claim 4 wherein the photo-oxidant comprises a dye component selected from the group consisting of one or more of:

methylene blue
thionine
acridine orange
rose bengal
phenosafranine
fluorescein
azure B
Capri blue
azure B plus acridine orange
methylene blue plus phenosafranine 8. A photopolymerizable vinyl monomer system inactive in the dark and containing a photo-redox catalyst for photopolymerizing said vinyl monomer over the visible light range of about 3800 A. to about 7200 A., said catalyst comprising:

(a) a photo-oxidant having the formula:

where R carries a positive charge and is an imonium, alkylimonium, dialkylimonium, or oxonium group; R' is hydrogen, or an amino, alkylamino, dialkylamino, or hydroxyl group; X is nitrogen or substituted carbon; Y is sulfur, oxygen or substituted nitrogen; and $A^{\ominus}$ is an anion, and (b) an organic sulfinic compound capable therewith of effecting visible solid state photopolymerization of vinyl monomers in said system.

9. The system of claim 8 wherein said sulfinic compound is selected from the group consisting of one or more of the organic sulfinic acids, salts of organic sulfinic acids, organic esters of sulfinic acids, sulfinamides, alkylsulfinamides, arylsulfinamides, adducts of sulfinic acids with carbonyl compounds, an adducts of sulfinic acids with an aldehyde.

10. The process of claim 1 wherein said photoactivatable dye is selected from the group consisting of phenothiazine, phenazine, acridine and xanthene dyes.

11. The process of claim 1 wherein said dye comprises a phenothiazine dye present in said system in an amount from $10^{-7}$ molar to $10^{-2}$ molar.

12. The process of claim 11 wherein said dye is selected from methylene blue, thionine, azure A and azure B.

13. The process of claim 4 in which said dye is a phenothiazine dye present in an amount of from about $10^{-7}$ molar to $10^{-2}$ molar.

14. A system according to claim 8 wherein said photo-oxidant is selected from the group consisting of phenothiazine, phenazine, acridine and xanthene dyes.

15. A system according to claim 14 in which said dye is a phenothiazine dye present in an amount of from about $10^{-7}$ molar to $10^{-2}$ molar.

16. A process for the polymerization of vinyl monomers to a solid mass comprising the steps of:

forming a liquid solution containing a vinyl monomer, an organic sulfinic compound selected from the group consisting of free organic sulfinic acids, salts and organic esters of such acids, adducts of such acids with one or more carbonyl compounds, and mixtures thereof and a phenothiazine dye in an amount of $10^{-7}$ to $10^{-2}$ molar, said solution being inactive in the dark but activatible to an excited photo-oxidant state when irradiated by visible light of a wavelength between about 3800 A. to about 7200 A., and exposing said solution to visible light containing said wavelengts for a period sufficient to polymerize the irradiated portions of said solution.

17. A photopolymerizable solution containing a vinyl monomer, an organic sulfinic compound selected from the group consisting of free organic sulfinic acids, salts and organic esters of such acids, adducts of such acids with one or more carbonyl compounds, and mixtures thereof and a phenothiazine dye in an amount of $10^{-7}$ to $10^{-2}$ molar, said solution being inactive in the dark but activatable to efficiently polymerize said monomer to the solid state when irradiated by said light.

References Cited

UNITED STATES PATENTS

| 2,875,047 | 2/1959 | Oster | 96—35.1 |
|---|---|---|---|
| 2,989,455 | 6/1961 | Neugebauer et al. | 204—159.23 |
| 3,047,422 | 7/1962 | Sites et al. | 96—115X |
| 3,097,096 | 7/1963 | Oster | 96—115X |

RONALD H. SMITH, Primary Examiner

U.S. Cl. X.R.

96—35.1; 204—159.24